United States Patent Office 3,188,031
Patented June 8, 1965

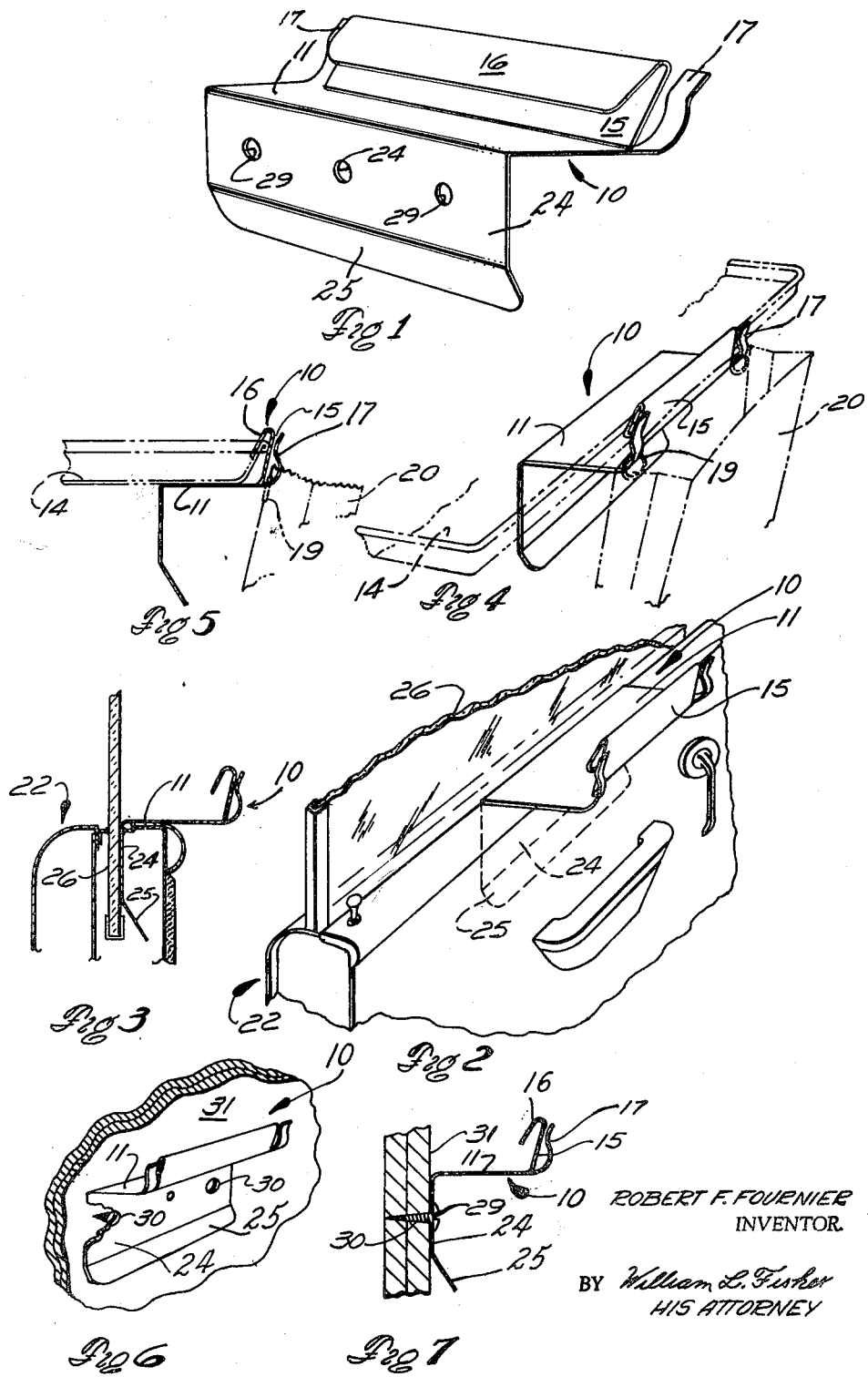

3,188,031
LITTER BAG HOLDER DEVICE
Robert F. Fournier, 24853 Tuscany, East Detroit, Macomb County, Mich.
Filed Apr. 11, 1963, Ser. No. 272,263
8 Claims. (Cl. 248—95)

This invention relates to litter bag holders and has for its object to provide an improved device of this type which can be mounted without additional fastening means in an automobile window and on a serving tray, as at a drive-in restaurant, by simply snapping it over the edge of the tray. On the other hand with additional fastening means the device can be conveniently located anywhere as on a wall.

The foregoing objective advantages and others will become apparent during the course of the following description, taken in conjunction with the accompanying drawings, in which:

FIG. 1 is a perspective view of a litter bag holder device embodying the invention;

FIGS. 2 and 3 are, respectively, perspective and vertical sectional views of the device mounted in an automobile window sash;

FIGS. 4 and 5 are, respectively, perspective and vertical sectional views of the device mounted on a food serving tray; and FIGS. 6 and 7 are, respectively, perspective and vertical sectional views of the device mounted on a wall.

Referring to the drawings in greater detail, 10 designates the device generally which is a sheet metal stamping preferably formed on progressive dies in one piece as shown. It comprises a body portion 11 with a U-shaped end by which the device can be snapped over the edge of a food serving tray as shown and indicated at 14 in FIGS. 4 and 5 in which is also shown a part 15 which upstands from the body portion 11 and a part 16 which is reversely bent in relation to the part 15. The parts 15 and 16 form the U-shape of such end and grip the edge of the tray 14 wedgingly with greater force as it is drawn downwardly on such edge. The portion 11 engages the underside of the tray 14 when the U-shaped end is in place over its edge and the device is thus completely stabilized on such tray.

The device also comprises hook means for suspending a litter bag in the form of a pair of prongs 17 spaced at its opposite sides between which prongs the parts 15 and 16 extend. The prongs 17 extend through pre-punched holes 18 in a litter bag 20 and suspended the same outwardly of the U-shaped end so that it can be readily removed and so that it hangs in open fashion as shown in FIG. 4 for the ready reception of litter.

The device also comprises a flat end on the body portion 11 opposite said U-shaped end by which the device can be inserted into an automobile door as shown and indicated at 22 in FIGS. 2 and 3. Such flat end comprises a flat section 24 and a terminal section 25 turned out from the flat section to cam the device out of the path of travel of the window bezel, indicated at 26, whenever the window is raised near its extreme position in its tracks beneath the device. The out-turned section 25 assists in retaining the device against accidental dislodgement from within the door 22 and also as a pilot in inserting it thereinto and against the window 27. Also as shown in these figures, the portion 11 engages a ledge 28 of the door when the flat section 24 is in place therein against the window.

The flat section 24 has means in it in the form of a pair of apertures 29 for the reception of external fastening means, as at 30, by which the device may be wall mounted as shown in FIGS. 6 and 7 in which the wall is designated 31. The section 24 also has a centrally located aperture 32 by which the device may be mounted on a post.

It will thus be seen that there has been provided by the present invention a liter bag holder device in which the object hereinabove set forth together with many other thoroughly practical advantages has been successfully achieved. While a preferred embodiment of the invention has been shown and described it is to be understood that modifications, variations and changes may be resorted to without departing from the spirit of the invention as set forth in the appended claims.

What is claimed is:

1. A litter bag holder device for use on a food serving tray comprising a body portion with hook means for suspending a litter bag, a U-shaped end on the body portion, the U-shaped end opening at an obtuse angle toward the body portion so that the device can be snapped over the edge of a food service tray, the U-shaped end having a spring action by which it wedgingly engages the edge of the tray when the device is in place thereon, the body portion so constructed in relation to the U-shaped end that the former bears against the underside of the tray when the latter is wedgingly engaged over the edge thereof.

2. A litter bag holder device comprising a body portion with hook means for suspending a litter bag, a U-shaped end on the body portion by which the device can be snapped over the edge of a food serving tray, the construction of said body portion and U-shaped end being such that the former engages the underside of the tray when the latter is in place over its edge, the hook means being located at the same end of the body portion as said U-shaped end.

3. The device as claimed in claim 2 in which the hook means is in the form of a pair of prongs spaced at opposite sides of the device and the U-shaped end extends over the width of the device within the space between said prongs.

4. A litter bag holder device comprising a flat body portion with hook means for suspending a litter bag, a flat end on the body portion by which the device can be inserted into an automobile window sash and for frictionally engaging the flat surface of the window therein, the body portion and flat end being at right angles to each other such that the former engages a ledge of the sash when the latter is in place therein against the window, the hook means upstanding from the end of the body portion opposite said flat end.

5. A litter bag holder device comprising a body portion with hook means for suspending a litter bag, a U-shaped end on the body portion by which the device can be snapped over the edge of a food serving tray, a flat end on the body portion opposite said U-shaped end by which the device can be inserted into an automobile window sash and for frictionally engaging the flat surface of the window therein, the U-shaped end opening at an obtuse angle toward the body portion such that the former engages the underside of the tray when the latter is in place over its edge, the body portion and flat end being at right angles to each other such that the former engages a ledge of the sash when the latter is in place therein against the window.

6. The device as claimed in claim 5 in which the flat end has a flat section and a terminal section turned away from the flat section to cam the device out of the path of travel of the window and to assist in retaining the device within the sash against accidental dislodgement.

7. The device as claimed in claim 5 in which the hook means is in the form of a pair of prongs spaced at opposite sides of the device and the U-shaped end extends over the width of the device within the space between said prongs.

8. The device as claimed in claim 6 in which said flat section is substantially at right angles to the body portion and has means by which the device may be wall mounted.

References Cited by the Examiner
UNITED STATES PATENTS

| | | | |
|---|---|---|---|
| 710,477 | 10/02 | Littell | 248—215 X |
| 1,435,637 | 11/22 | Goldman | 248—95 X |
| 1,564,989 | 12/25 | Weisberger | 248—300 |

CLAUDE A. LE ROY, *Primary Examiner.*

FRANK L. ABBOTT, *Examiner.*